(12) United States Patent
Kim et al.

(10) Patent No.: US 12,564,811 B2
(45) Date of Patent: Mar. 3, 2026

(54) DEHUMIDIFICATION LIQUID REGENERATION APPARATUS AND LIQUID DEHUMIDIFICATION SYSTEM INCLUDING SAME

(71) Applicant: KOREA ENERGY TECHNOLOGY GROUP, Daejeon (KR)

(72) Inventors: Seon Hwa Kim, Sejong-si (KR); Young Jin Roh, Sejong-si (KR)

(73) Assignee: KOREA ENERGY TECHNOLOGY GROUP, Daejeon (KR)

( * ) Notice: Subject to any disclaimer, the term of this patent is extended or adjusted under 35 U.S.C. 154(b) by 318 days.

(21) Appl. No.: 18/181,453

(22) Filed: Mar. 9, 2023

(65) Prior Publication Data

US 2024/0299876 A1 Sep. 12, 2024

(51) Int. Cl.
*B01D 53/14* (2006.01)
*B01D 3/06* (2006.01)
(Continued)

(52) U.S. Cl.
CPC ........... *B01D 53/1425* (2013.01); *B01D 3/06* (2013.01); *B01D 53/1418* (2013.01);
(Continued)

(58) Field of Classification Search
CPC .. B01D 53/1425; B01D 3/06; B01D 53/1418; B01D 53/263; B01D 2257/80;
(Continued)

(56) References Cited

U.S. PATENT DOCUMENTS

| | | | | | |
|---|---|---|---|---|---|
| 2,355,828 | A | * | 8/1944 | Taylor | ................... F24F 3/1417 |
| | | | | | 62/271 |
| 4,841,740 | A | * | 6/1989 | Assaf | ........................ F28C 3/06 |
| | | | | | 62/271 |

(Continued)

FOREIGN PATENT DOCUMENTS

| | | | | | |
|---|---|---|---|---|---|
| CN | 106288052 | A | * | 1/2017 | .............. F24F 3/147 |
| CN | 106369706 | A | * | 2/2017 | ................ F24F 3/14 |

(Continued)

OTHER PUBLICATIONS

Epo translation of CN107170338 (Year: 2017).*

*Primary Examiner* — Stephen Hobson

(57) ABSTRACT

The present invention relates to a dehumidification liquid regeneration apparatus for regenerating a dehumidification liquid, which is used to dehumidify air in a liquid dehumidification system and thus the concentration thereof is decreased, into a dehumidification liquid whose concentration is suitable for dehumidification and includes a regeneration tank in which a dehumidification liquid used for dehumidification treatment is stored, a vacuum pump connected to the regeneration tank, and a water vapor recovery module provided between the regeneration tank and the vacuum pump. The water vapor recovery module includes a water vapor recovery chamber and an exhaust air chamber configured to store and discharge air from which moisture is removed, and thus an internal pressure of the regeneration tank can be decreased to quickly and efficiently regenerate the dehumidification liquid, and damage to the vacuum pump due to moisture can be prevented.

8 Claims, 3 Drawing Sheets

(51) Int. Cl.
  B01D 53/26   (2006.01)
  *F24F 3/14*    (2006.01)
  *F24F 3/153*   (2006.01)

(52) U.S. Cl.
  CPC ........ B01D 53/263 (2013.01); B01D 2257/80
   (2013.01); *F24F 3/1411* (2013.01); *F24F*
   *3/1417* (2013.01); *F24F 2003/144* (2013.01);
   *F24F 2003/1458* (2013.01); *F24F 3/153*
               (2013.01)

(58) Field of Classification Search
  CPC ........ F24F 3/1411; F24F 3/1417; F24F 3/153;
        F24F 2003/144; F24F 2003/1458
  See application file for complete search history.

(56)     References Cited

U.S. PATENT DOCUMENTS

| | | | | | |
|---|---|---|---|---|---|
| 4,939,906 | A | * | 7/1990 | Spatz | F24F 3/1417 |
| | | | | | 62/271 |
| 5,097,668 | A | * | 3/1992 | Albers | F24F 3/1417 |
| | | | | | 62/271 |
| 5,797,272 | A | * | 8/1998 | James | F24F 3/1411 |
| | | | | | 62/93 |
| 6,156,102 | A | * | 12/2000 | Conrad | B01D 53/18 |
| | | | | | 95/193 |
| 6,266,975 | B1 | * | 7/2001 | Assaf | F24F 3/1411 |
| | | | | | 62/271 |
| 9,423,140 | B2 | * | 8/2016 | Betts | F28D 7/1615 |
| 10,295,203 | B2 | * | 5/2019 | Velasco Valcke | E03B 3/28 |
| 2013/0298766 | A1 | * | 11/2013 | Ehrenberg | B01D 53/268 |
| | | | | | 95/52 |
| 2016/0281999 | A1 | * | 9/2016 | Yagi | F24F 3/14 |
| 2018/0036675 | A1 | * | 2/2018 | Antony Prince | B01D 61/368 |
| 2019/0331353 | A1 | * | 10/2019 | Edström | B01D 53/1425 |
| 2022/0118403 | A1 | * | 4/2022 | Fradette | B01D 53/75 |
| 2022/0136715 | A1 | * | 5/2022 | Edström | B01D 53/263 |
| | | | | | 62/94 |
| 2023/0068981 | A1 | * | 3/2023 | Kim | F24F 3/1411 |
| 2025/0154082 | A1 | * | 5/2025 | Henson | B01D 53/268 |

FOREIGN PATENT DOCUMENTS

| | | | | | |
|---|---|---|---|---|---|
| CN | 106871277 | A | * | 6/2017 | ........... F24F 3/1417 |
| CN | 107170338 | | * | 9/2017 | |
| CN | 107170338 | A | * | 9/2017 | ............ G09B 23/16 |
| CN | 111765550 | A | * | 10/2020 | ........... F24F 3/1411 |
| CN | 113899026 | A | * | 1/2022 | ............ B01D 53/18 |
| WO | WO-2011016809 | A1 | * | 2/2011 | ........ B60H 1/32014 |
| WO | WO-2021222925 | A1 | * | 11/2021 | ........... F24F 5/0035 |

* cited by examiner

DEHUMIDIFICATION LIQUID REGENERATION APPARATUS AND LIQUID DEHUMIDIFICATION SYSTEM INCLUDING SAME

BACKGROUND

1. Field of the Invention

The present invention relates to a dehumidification liquid regeneration apparatus for regenerating a dehumidification liquid, which is used to dehumidify air in a liquid dehumidification system and thus the concentration thereof is decreased, into a dehumidification liquid whose concentration is suitable for dehumidification, and a liquid dehumidification system including the same.

2. Discussion of Related Art

In air conditioning systems, dehumidification systems have long been used to control humidity in spaces.

In recent years, with the development of various technologies and industries, the number of technical fields and industries which require dehumidification and temperature control is further increasing.

For example, a technology for controlling temperature and humidity in a chamber filled with a gas such as hydrogen or natural gas is required, and in cold chains such as low-temperature (frozen and refrigerated) distribution centers, the importance of temperature and humidity control technology in reducing distribution losses is emerging due to online fresh food markets or product diversification.

The performance of chambers or warehouses used in various industries may be degraded by the inflow of moist air, and in the warehouses where products are stored, the freshness of products is lowered, hygiene problems and defect problems are caused by defective wet wrapping paper, frozen floors cause workers to slip and become a factor in safety accidents, and thus the demand for technology to prevent condensation and frost generation in the chambers or warehouses is continuously increasing.

According to these technological needs, a liquid dehumidification system which can reduce energy consumption and carbon dioxide ($CO_2$) emissions has recently been developed.

The liquid dehumidification system is a dehumidification system which may actively remove moisture contained in gas or air in a chamber or warehouse using a dehumidification liquid such as a potassium formate solution as a dehumidifying material.

As illustrated in FIG. 1, the liquid dehumidification system includes a dehumidification apparatus 100 which removes moisture from air inside a chamber or warehouse 1 using a dehumidification liquid f and a regeneration apparatus having a regeneration tank 200 for regenerating the dehumidification liquid f whose concentration is decreased during a dehumidification process.

The regeneration apparatus may regenerate the dehumidification liquid f by lowering an internal pressure of the regeneration tank 200 to evaporate moisture contained in the dehumidification liquid f into water vapor at a relatively low temperature.

In order to quickly regenerate the dehumidification liquid f, it is necessary to connect a vacuum pump or the like in order to maintain the low pressure in the regeneration tank 200, and since most of the gas exhausted from the regeneration tank 200 in a regeneration process is water vapor, there is a problem that a vacuum pump is damaged due to high moisture.

SUMMARY OF THE INVENTION

The present invention is directed to providing a dehumidification liquid regeneration apparatus capable of quickly regenerating a dehumidification liquid, which is used to dehumidify air in a chamber or warehouse in a liquid dehumidification system and thus the concentration thereof is decreased, and improving the durability of a vacuum pump, and a liquid dehumidification system including the same.

According to an aspect of the present invention, there is provided a dehumidification liquid regeneration apparatus (20) including a regeneration tank (200) in which a dehumidification liquid (f) used for dehumidification treatment is stored, a vacuum pump (300) connected to the regeneration tank (200), a water vapor recovery module (500) provided between the regeneration tank (200) and the vacuum pump (300), and a control unit (700).

The regeneration tank (200) may include a first heat exchanger (250) configured to evaporate moisture contained in the dehumidification liquid (f).

The water vapor recovery module (500) may include a water vapor recovery chamber (510) and an exhaust air chamber (550) provided between the water vapor recovery chamber (510) and the vacuum pump (300). In this case, the water vapor recovery chamber (510) may include a first housing (511) in which an inlet (511a) connected to the regeneration tank (200) is formed, a flow guide (512) formed in the first housing (511), a second heat exchanger (520) provided in the first housing (511), and a drain pipe (530) provided at a lower side of the first housing (511). In addition, the exhaust air chamber (550) may include a second housing (551) in which an outlet (551b) connected to the vacuum pump (300) is formed, a pressure sensor (560) which measures an internal pressure of the second housing (551), a humidity sensor (570) which measures an internal humidity in the second housing (551), and an external air inlet pipe (590) connected to the second housing (551).

The external air inlet pipe (590) may further include a valve (591), and the control unit (700) may control the valve (591) to open the external air inlet pipe (590) when a humidity measured by the humidity sensor (570) is a set humidity or higher.

The second heat exchanger (520) may include a pipe through which a refrigerant flows.

According to another aspect of the present invention, there is provided a liquid dehumidification system including a dehumidification apparatus (100) which dehumidifies air using the dehumidification liquid (f) and a dehumidification liquid regeneration apparatus formed to be connected to the dehumidification apparatus (100).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the present invention will be described with reference to the accompanying drawings.

Figure 1:
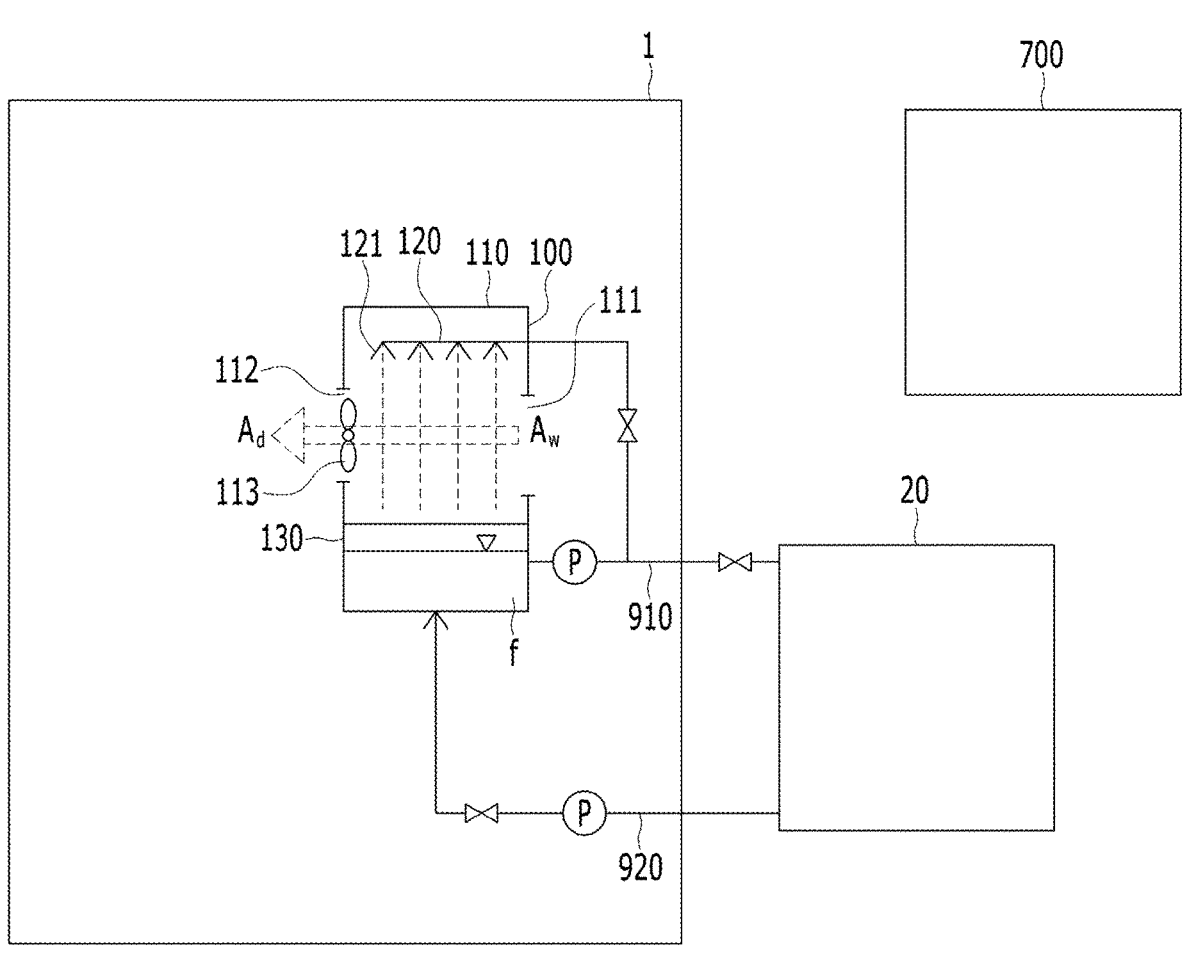
FIG. 1 is a view illustrating a liquid dehumidification system according to one embodiment of the present invention.
Figure 2:
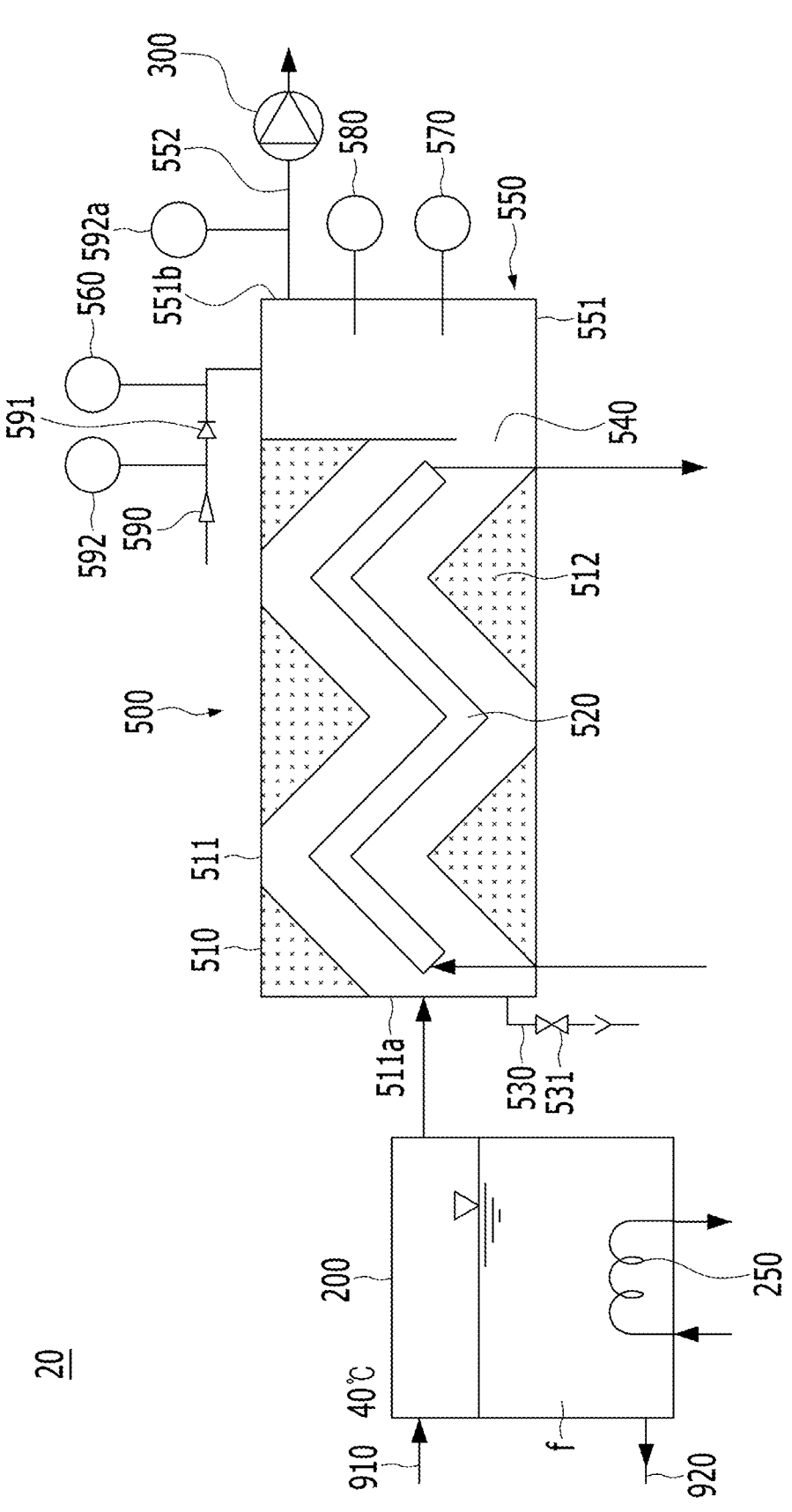
FIG. 2 is a view illustrating a dehumidification liquid regeneration apparatus according to a first embodiment of the present invention.
Figure 3:
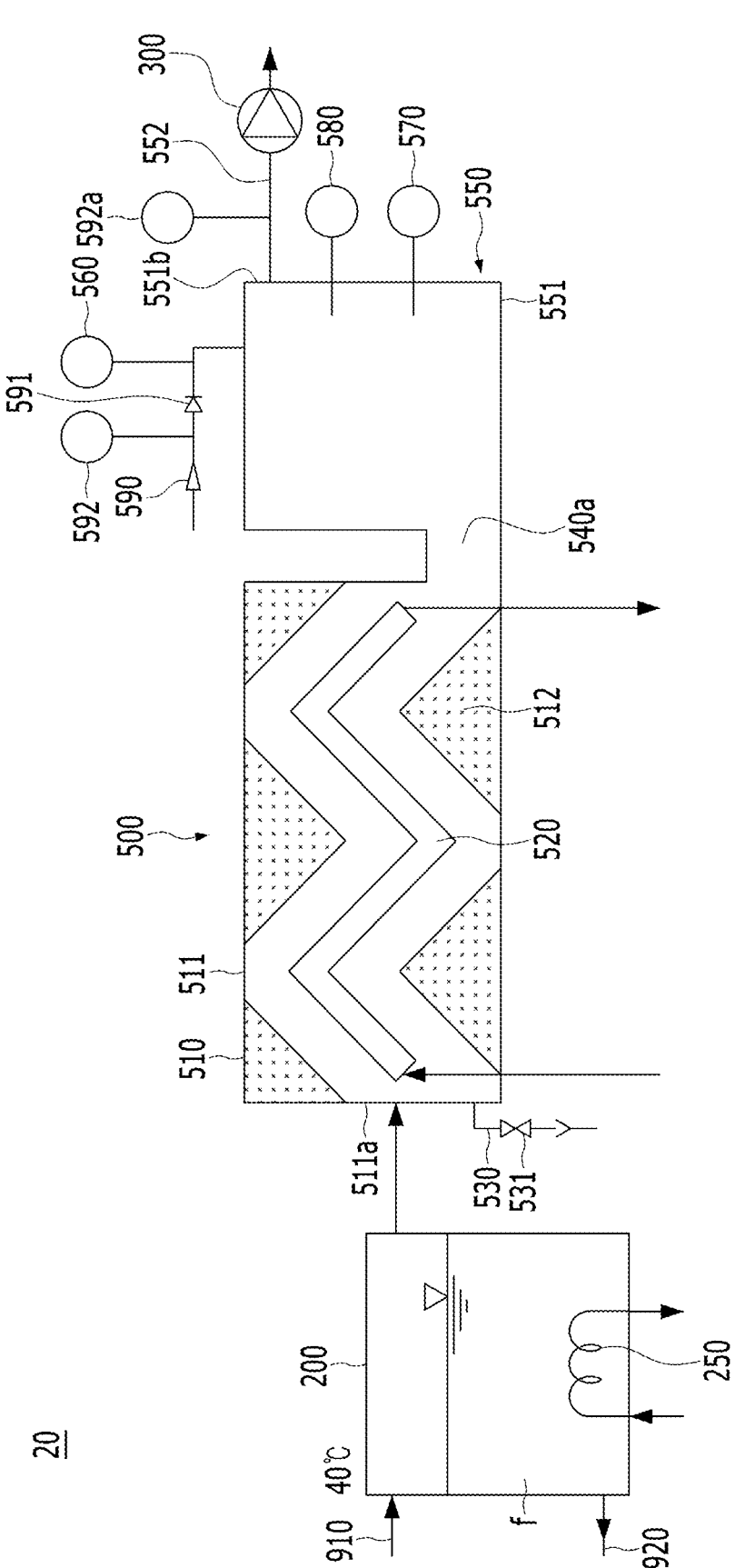
FIG. 3 is a view illustrating a dehumidification liquid regeneration apparatus according to a second embodiment of the present invention.

FIG. 1 is a view illustrating a liquid dehumidification system according to one embodiment of the present invention, FIG. 2 is a view illustrating a dehumidification liquid regeneration apparatus according to a first embodiment of the present invention, and FIG. 3 is a view illustrating a dehumidification liquid regeneration apparatus according to a second embodiment of the present invention.

As illustrated in FIG. 1, the liquid dehumidification system includes a dehumidification apparatus 100 using a dehumidification liquid f, a dehumidification liquid regeneration apparatus 20 of the present invention connected to the dehumidification apparatus 100, and a control unit 700 which controls operation of the dehumidification system.

In the liquid dehumidification system illustrated in FIG. 1, the dehumidification apparatus 100 using the dehumidification liquid f is formed in a dehumidification warehouse or chamber 1, but the liquid dehumidification system of the present invention is not limited thereto, and it is enough as long as the dehumidification liquid regeneration apparatus 20 is connected to the dehumidification apparatus 100 and operated.

A specific configuration of the dehumidification liquid regeneration apparatus 20 of the present invention will be described below with reference to FIGS. 2 and 3.

The dehumidification liquid regeneration apparatus 20 of the present invention includes a regeneration tank 200, a vacuum pump 300, a water vapor recovery module 500, and the control unit 700 which controls operation of the dehumidification liquid regeneration apparatus 20.

In the regeneration tank 200, a dehumidification liquid f having a decreased concentration is regenerated into a high concentration dehumidification liquid f.

The dehumidification liquid f is a liquid having a characteristic of adsorbing moisture from the surrounding gas or air containing the moisture at a low temperature and emitting water vapor into gas or air at a high temperature according to a difference in water vapor pressure between the dehumidification liquid f and the gas or air to be dehumidified.

A high concentration dehumidification liquid is used as the dehumidification liquid f, and as the dehumidification liquid f adsorbs more moisture in a dehumidification process, the concentration of the dehumidification liquid is further decreased, and when the concentration becomes a predetermined concentration or lower, dehumidification efficiency also decreases.

Accordingly, in order to reuse the dehumidification liquid f diluted in the dehumidification process in the dehumidification apparatus 100 illustrated in FIG. 1, a regeneration process of, specifically, evaporating the moisture adsorbed by the dehumidification liquid f to increase the concentration of the dehumidification liquid f to return the dehumidification liquid f to the dehumidification liquid f having high dehumidification efficiency is required.

As illustrated in FIG. 2, the regeneration tank 200 includes a first heat exchanger 250. The concentration of the dehumidification liquid f may be increased to regenerate the dehumidification liquid f by heating the dehumidification liquid f using the first heat exchanger 250 to evaporate the moisture.

An installed power source may be used as a power source for operation of the first heat exchanger 250, or power generated through Eco-friendly power generation, such as solar power generation, may be used for operation of the first heat exchanger 250.

Moisture of the dehumidification liquid f of the regeneration tank 200 may be evaporated at a relatively low temperature by lowering the pressure in the regeneration tank 200.

An internal pressure of the regeneration tank 200 may be lowered by exhausting air in the regeneration tank 200 using the vacuum pump 300.

At the initial stage, the vacuum pump 300 serves to exhaust the air in the regeneration tank 200 to lower the pressure, and in the regeneration process, the vacuum pump 300 serves to exhaust water vapor generated by evaporating moisture contained in the dehumidification liquid f to the outside of the regeneration tank 200.

Although a water seal vacuum pump may be used as the vacuum pump 300, the water seal vacuum pump has problems that a separate water tank for operation is required, a structure becomes large, and the decrease in pressure is limited.

When a dry vacuum pump 300 is used, although a simple structure may be implemented, since water vapor generated during a regeneration process in the regeneration tank 200 is a humid gas, the vacuum pump 300 may be damaged or broken when the water vapor is directly exhausted through the vacuum pump 300.

The water vapor recovery module 500 may recover moisture from the water vapor exhausted from the regeneration tank 200 to prevent damage to the dry vacuum pump 300.

As illustrated in FIGS. 2 and 3, the water vapor recovery module 500 includes a water vapor recovery chamber 510 and an exhaust air chamber 550 provided between the water vapor recovery chamber 510 and the vacuum pump 300.

In the water vapor recovery chamber 510, water vapor discharged from the regeneration tank 200 is condensed and converted into water to remove the water vapor.

An inlet 511a of a first housing 511 constituting the water vapor recovery chamber 510 is connected to the regeneration tank 200.

A flow guide 512 which guides the flow of introduced water vapor and a second heat exchanger 520 formed along the flow guide 512 are formed in the first housing 511.

Water vapor introduced through the inlet 511a is condensed and converted into water by the second heat exchanger 520.

As illustrated in FIG. 2, the flow guide 512 and the second heat exchanger 520 may be formed in zigzag shapes so that the introduced water vapor comes into contact with the flow guide 512 and the second heat exchanger 520 more and is easily condensed.

The second heat exchanger 520 may use any heat exchanger capable of condensing water vapor, and may also be formed as a pipe through which a refrigerant flows.

Particularly, in a case in which the liquid dehumidification system of the present invention is used in a cold storage of a cold chain, it may be more effective to form the pipe through which the refrigerant or cooling water flows as the second heat exchanger 520.

For example, water vapor may be condensed using a low temperature refrigerant or cooling water without using additional energy by configuring the refrigerant or cooling water of the cooling system provided in the cold storage to be supplied to a pipe of the second heat exchanger 520.

Since water is generated by condensing water vapor in the first housing 511, it is preferable that a drain pipe 530 be installed at a lower side of the first housing 511.

A drain valve 531 may also be additionally installed in the drain pipe 530, and a drain time may be selected.

The exhaust air chamber 550 is a chamber into which water vapor or air that has been dehumidified while passing through the water vapor recovery chamber 510 is introduced.

As illustrated in FIG. 2, the exhaust air chamber 550 may be in contact with the water vapor recovery chamber 510 and connected to the water vapor recovery chamber 510 through a connecting hole 540 and, as illustrated in FIG. 3, may be formed as a separate chamber and connected to the water vapor recovery chamber 510 through a connecting pipe 540a.

A second housing 551 constituting the exhaust air chamber 550 is connected to the vacuum pump 300 through an outlet 551b.

A pressure sensor 560, a humidity sensor 570, a temperature sensor 580, and the like which measure an internal pressure, a humidity, and a temperature may be installed in the second housing 551.

As illustrated in FIGS. 2 and 3, the humidity sensor 570 may also be installed in the second housing 551 or in an exhaust pipe 552 which is disposed between and connected to the outlet 551b and the vacuum pump 300.

An external air inlet pipe 590 through which external air is introduced is further installed in the second housing 551.

One end of the external air inlet pipe 590 may be exposed to the outside or may also be connected to a separate air tank (not illustrated).

A flow meter 592 capable of measuring and controlling a flow rate of introduced external air may be further provided in the external air inlet pipe 590.

Another flow meter 592a may be further provided in the exhaust pipe 552.

In addition, it is preferable that a valve 591 capable of controlling opening and closing the external air inlet pipe 590 be further installed.

In this case, the control unit 700 controls the valve 591 to open the external air inlet pipe 590 when a humidity measured by the humidity sensor 570 is a set humidity or higher.

It is preferable that a value of the set humidity be prestored in the control unit 700, and it is preferable that the value of the set humidity be set to a value of maximum humidity which does not affect the durability of the vacuum pump 300 when external air is introduced.

Through such a configuration, even when some water vapor enters the exhaust air chamber 550, since air which is mixed with external air and thus a humidity thereof is lowered is exhausted through the vacuum pump 300, damage to the vacuum pump due to moisture can be prevented.

The dehumidification liquid regeneration apparatus 20 having such a configuration may be coupled to a dehumidification apparatus or module of a general liquid dehumidification system to implement a system capable of performing more efficient dehumidification.

According to an embodiment of the present invention, in a dehumidification liquid regeneration apparatus of the present invention, since a water vapor recovery module 500, which recovers water vapor discharged from a regeneration tank 200 is formed between the regeneration tank 200 and the vacuum pump 300, there is an advantage of maximally preventing the moisture of the water vapor from entering the vacuum pump 300 to prevent damage to vacuum pump 300 and lowering an internal pressure of the regeneration tank 200 to quickly regenerate a dehumidification liquid f.

In addition, in a dehumidification liquid regeneration apparatus of the present invention, since a dry vacuum pump 300 is used, there are advantages that a simple and small dehumidification liquid regeneration apparatus can be formed when compared to a case in which a water seal vacuum pump is installed, and a pressure adjustment in the regeneration tank 200 can be performed more smoothly.

In addition, in a liquid dehumidification system of the present invention, since the dehumidification liquid regeneration apparatus is provided, a diluted dehumidification liquid f can be quickly regenerated and reused again for dehumidification treatment, and thus there is an advantage of significantly improving dehumidification efficiency.

The scope of the present invention is defined by the appended claims, and encompasses all modifications or alterations derived from meanings, the scope and equivalents of the appended claims.

What is claimed is:

1. A dehumidification liquid regeneration apparatus comprising:
    a regeneration tank in which a dehumidification liquid used for dehumidification treatment is stored;
    a vacuum pump connected to the regeneration tank;
    a water vapor recovery module provided between the regeneration tank and the vacuum pump; and
    a control unit,
    wherein the water vapor recovery module includes:
        a water vapor recovery chamber; and
        an exhaust air chamber provided between the water vapor recovery chamber and the vacuum pump,
        wherein the water vapor recovery chamber includes a first housing in which an inlet connected to the regeneration tank is formed, a flow guide formed in the first housing, a second heat exchanger provided in the first housing, and a drain pipe provided at a lower side of the first housing, and
        wherein the exhaust air chamber includes a second housing in which an outlet connected to the vacuum pump is formed, a pressure sensor configured to measure an internal pressure of the second housing, a humidity sensor configured to measure an internal humidity in the second housing, and an external air inlet pipe connected to the second housing.

2. The dehumidification liquid regeneration apparatus of claim 1, wherein the regeneration tank includes a first heat exchanger configured to evaporate moisture contained in the dehumidification liquid.

3. A liquid dehumidification system comprising:
    a dehumidification apparatus which dehumidifies air using a dehumidification liquid; and
    the dehumidification liquid regeneration apparatus of claim 2 formed to be connected to the dehumidification apparatus.

4. The dehumidification liquid regeneration apparatus of claim 1, wherein:
    the external air inlet pipe further includes a valve; and
    the control unit controls the valve to open the external air inlet pipe when a humidity measured by the humidity sensor is a set humidity or higher.

5. A liquid dehumidification system comprising:

a dehumidification apparatus which dehumidifies air using a dehumidification liquid; and the dehumidification liquid regeneration apparatus of claim 4 formed to be connected to the dehumidification apparatus.

6. The dehumidification liquid regeneration apparatus of claim 1, wherein the second heat exchanger includes a pipe through which a refrigerant flows.

7. A liquid dehumidification system comprising:

a dehumidification apparatus which dehumidifies air using a dehumidification liquid; and the dehumidification liquid regeneration apparatus of claim 5 formed to be connected to the dehumidification apparatus.

8. A liquid dehumidification system comprising:

a dehumidification apparatus which dehumidifies air using a dehumidification liquid; and the dehumidification liquid regeneration apparatus of claim 1 formed to be connected to the dehumidification apparatus.

\* \* \* \* \*